United States Patent [19]
Greer et al.

[11] Patent Number: 5,986,211
[45] Date of Patent: Nov. 16, 1999

[54] VIEWING WINDOW CONSTRUCTION FOR A DISCONNECT SWITCH

[75] Inventors: David E. Greer, Lexington; Terry A. Cassity, Paris; Jonathan H. Van Camp, Lexington, all of Ky.

[73] Assignee: Square D Company, Palatine, Ill.

[21] Appl. No.: 09/026,204

[22] Filed: Feb. 19, 1998

[51] Int. Cl.⁶ ..................................... H02B 1/30
[52] U.S. Cl. .............. 174/61; 174/66; 220/242; 361/616
[58] Field of Search .................. 174/50, 61, 66; 220/3.8, 242; 361/601, 602, 605, 616, 641, 659, 837

[56] References Cited

U.S. PATENT DOCUMENTS

| | | | |
|---|---|---|---|
| 2,671,134 | 3/1954 | Choystie | 73/647 |
| 3,217,129 | 11/1965 | Hufnagel | 200/308 |
| 3,227,831 | 1/1966 | Jacks et al. | 200/50.11 |
| 3,681,663 | 8/1972 | Albers | 361/678 |
| 4,107,492 | 8/1978 | Moon, Jr. et al. | 200/81.9 M |
| 4,835,348 | 5/1989 | Poling et al. | 200/5 EA |

*Primary Examiner*—Kristine Kincaid
*Assistant Examiner*—Dhiru R Patel
*Attorney, Agent, or Firm*—David R. Stacey; Larry I. Golden; Larry T. Shrout

[57] ABSTRACT

An improved viewing window construction for an electrical disconnect switch 10. The improved construction of the viewing window 70 permits easier installation of the viewing window 70 while at the same time reducing the complexity of the switch cover manufacturing process, eliminating the need for a window retainer 46 and increasing the resistance to the ingress of water when subjected to a stream of water under pressure.

13 Claims, 5 Drawing Sheets

VIEWING WINDOW CONSTRUCTION FOR A DISCONNECT SWITCH

FIELD OF THE INVENTION

The present invention relates to the field of electrical disconnect switches and particularly to an improved viewing window for a switch cover.

BACKGROUND OF THE INVENTION

The need for viewing windows in electrical disconnect switches is documented in U.S. Pat. No. 5,243,161, assigned to the assignee of the present invention and is hereby incorporated by reference. The viewing window of the '161 patent is placed in an escutcheon or formed recess in the switch cover and is held in place by a retainer which is placed over the window and fastened to the cover. Escutcheons or draws in a metal cover, especially when two are required as in the '161 patent, can cause distortions in the cover which are functionally and esthetically unacceptable. The tooling required to make draws can be complex and expensive. It would therefore be desirable to provide a disconnect switch cover with a viewing window which does not require complex and expensive tooling and which also simplifies the assembly process while meeting the requirements of national and international standards for protection against the ingress of dust and water under pressure.

SUMMARY OF THE INVENTION

The improved viewing window incorporates a generally transparent window which has an integrally formed sealing flange. The improved viewing window eliminates the need for an escutcheon in the switch cover and also the need for a retaining plate to hold the window securely in the escutcheon to effect a water and dust tight seal. Installation is also easier since the viewing window is installed on the outside of the switch cover and therefore does not require access to both the inside and the outside of the cover during installation. The integrally formed sealing flange, being placed against a gasket on the outside surface of the switch cover, provides a better seal against the ingress of water under pressure, such as during a hose down required in some industries. The improved viewing window may also incorporate an integrally formed magnifying lens which permits the viewing window size to be reduced while still providing an adequate view of the switch state.

Figure 1:
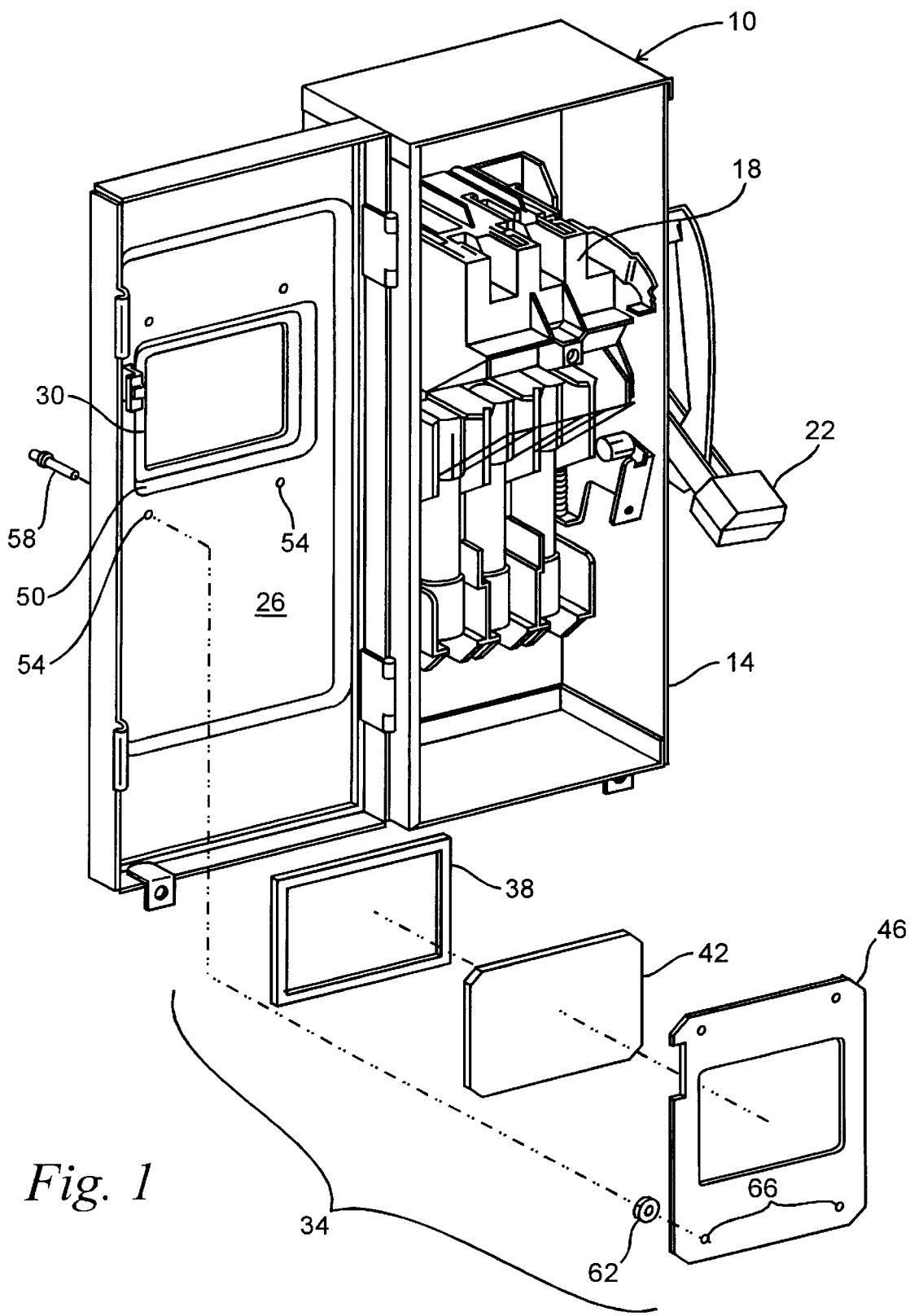
FIG. 1 is an electrical disconnect switch with a viewing window of the prior art shown in exploded view.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates a typical disconnect switch 10 as known in the art which includes an enclosure 14 for enclosing a switch mechanism 18. The switch mechanism 18 can be selectively moved between an OFF and an ON position by operating an external handle 22. The enclosure 14 includes a cover 26 which is maintained in a closed position during normal operation, but can be rotated to an open position when the handle 22 is in the switch OFF position. The cover 26, as illustrated in FIG. 1, includes an opening 30 for a viewing window 34 as disclosed in the '161 patent. The viewing window 34 includes a gasket 38, a viewing window pane 42, and a viewing window retainer 46. The opening 30 is located in an escutcheon 50 or shallow draw formed in the cover 26. The escutcheon 50 is dimensioned to receive the gasket 38 and window pane 42 and is just deep enough to cause the gasket 38 to be compressed between the window pane 42 and the cover 26 when the window retainer 46 is secured to the cover 26. A plurality of holes 54 are located in the cover 26 around the escutcheon 50. Each hole 54 receives a rivet 58 which passes through the hole 54, an individual rivet gasket 62 and a corresponding hole 66 in the window retainer 46.

Figure 2:
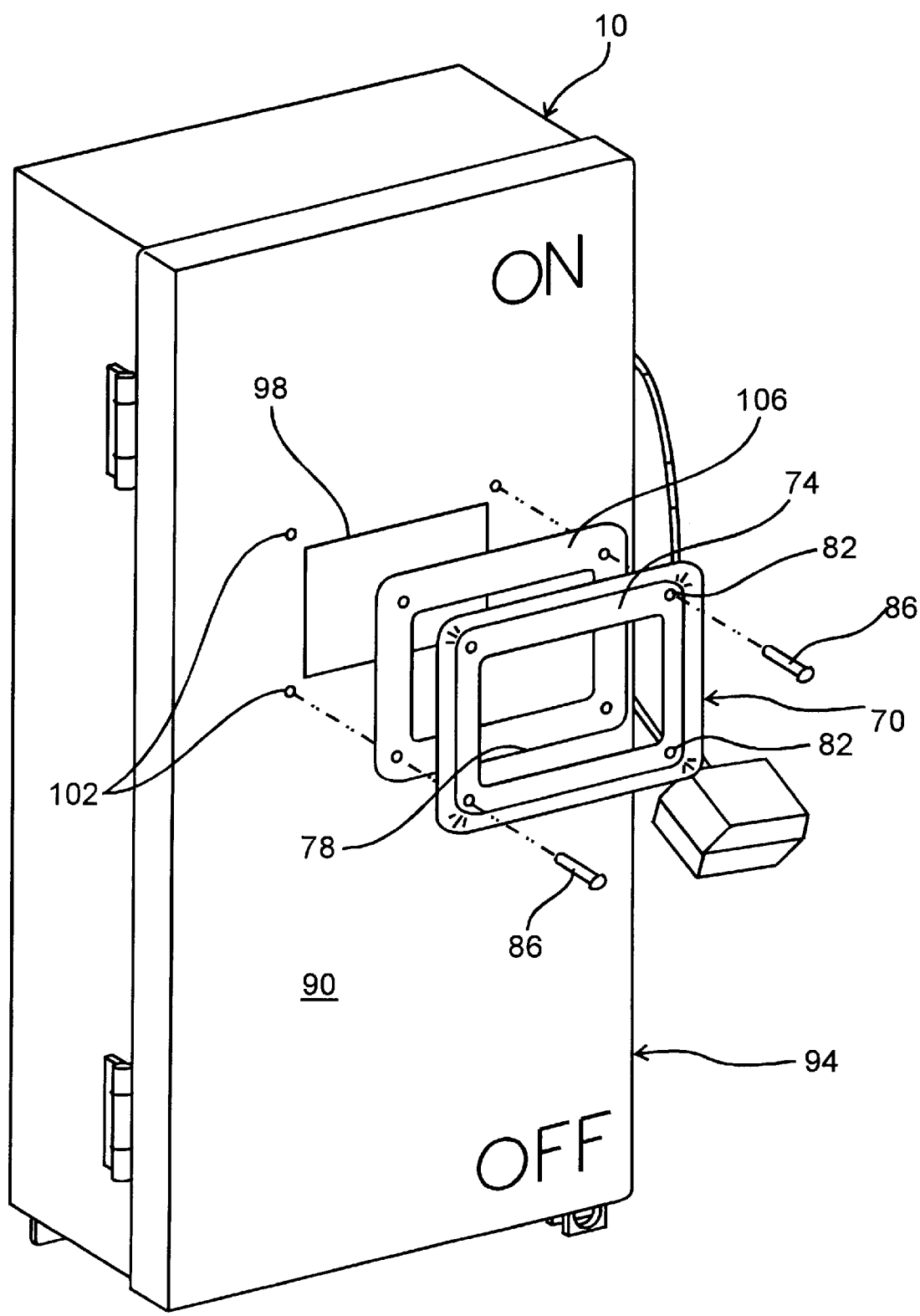
FIG. 2 is an electrical disconnect switch with an improved viewing window of the present invention shown in exploded view.

Referring now to FIG. 2, the improved construction viewing window of the present invention is shown, generally indicated by reference numeral 70. The viewing window 70 includes an integrally formed sealing flange 74 surrounding a transparent viewing area 78, through which the ON or OFF state of the switch mechanism 18 can be visually verified. The sealing flange 74 includes a plurality of holes 82 spaced about its periphery for receiving rivets 86 which secure the viewing window 70 to a generally flat outside surface 90 of the switch cover 94. An opening 98, dimensioned to be slightly larger than the viewing area 78, is provided in the switch cover 94. A plurality of holes 102 are spaced about the perimeter of the opening 98 such that they coincide with the holes 82 of the sealing flange 74 and thereby receive the rivets 86 which secure the viewing window 70 to the outside surface of the switch cover 94. A gasket 106, dimensioned and shaped to coincide with the sealing flange 74 is positioned around the opening 98 on the outside surface 90 of the switch cover 94 prior to installing the viewing window 70. As the viewing window 70 is installed, a rear portion 110 of the viewing area 78 is received within the opening 98 and the sealing flange 74 is pressed against the gasket 106 (see FIG. 4). Rivets 86 are placed in the coinciding holes 82 and 102 and secured to complete the installation of the viewing window 70 on the switch cover 94. In the preferred embodiment, the surface of the sealing flange 74 is textured or conditioned such that it is opaque. The front surface 114 of the viewing area 78 is recessed behind the sealing flange 74 to prevent scratching of the front surface 114 during shipping. It is also within the scope of the invention to include within the viewing area 78 a magnifying lens, either integrally formed from the viewing window or attached thereto. The magnifying lens, while making the visual verification of the ON or OFF state of the switch mechanism 18 easier, also permits the physical size of the viewing window 70 to be reduced. Reducing the size of the viewing window 70 also reduces the size of the opening 98 required in the switch cover 94, which in turn reduces the area to be sealed against the ingress of water and reduces the probability that water will enter the disconnect switch 10. It is also within the scope of the invention that the gasket 106 could be in the form of an "O" ring or a sealing caulk such as silicon of other acceptable water and dust seals.

Figure 3:
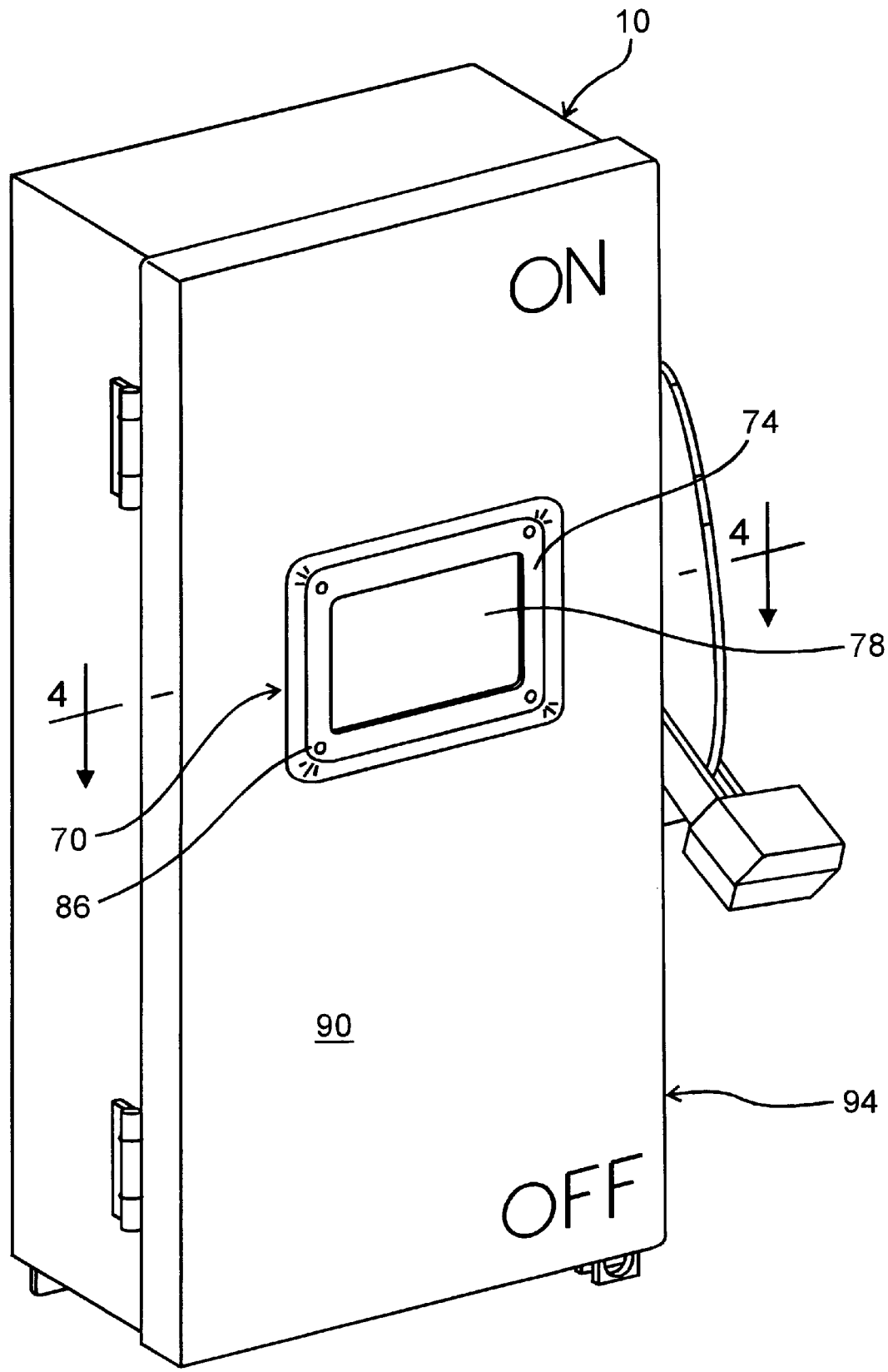
FIG. 3 is an electrical disconnect switch illustrating an installed viewing window of the present invention.

FIG. 3 illustrates a viewing window 70 in accordance the present invention installed on the cover 94 of an electrical disconnect switch 10.

Figure 4:
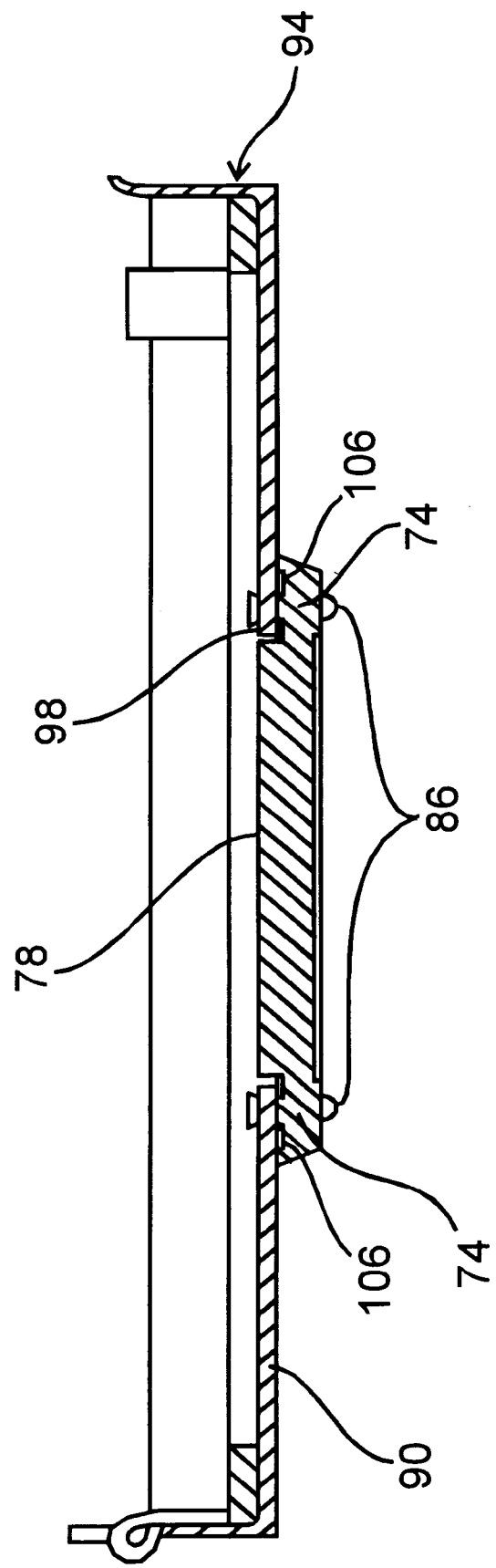
FIG. 4 is a cross-sectional view of the disconnect switch cover and viewing window of the present invention taken along line 4—4 of FIG. 3.

FIG. 4 is a cross-section taken through the viewing window 70 which illustrates how the viewing area 78 is received in the opening 98 of the cover 94 and the sealing flange 74 presses the gasket 106 against the cover 94. From the cross-sectional view it can easily be seen that water under pressure, such as a hose down required in some industry applications, being applied to the outside surface 90 of the cover 94 and viewing window 70 will cause the integral sealing flange 74 to be pressed even tighter against the cover 94 and gasket 106, thereby effecting a better water tight seal between the viewing window 70 and the cover 94.

Figure 5:
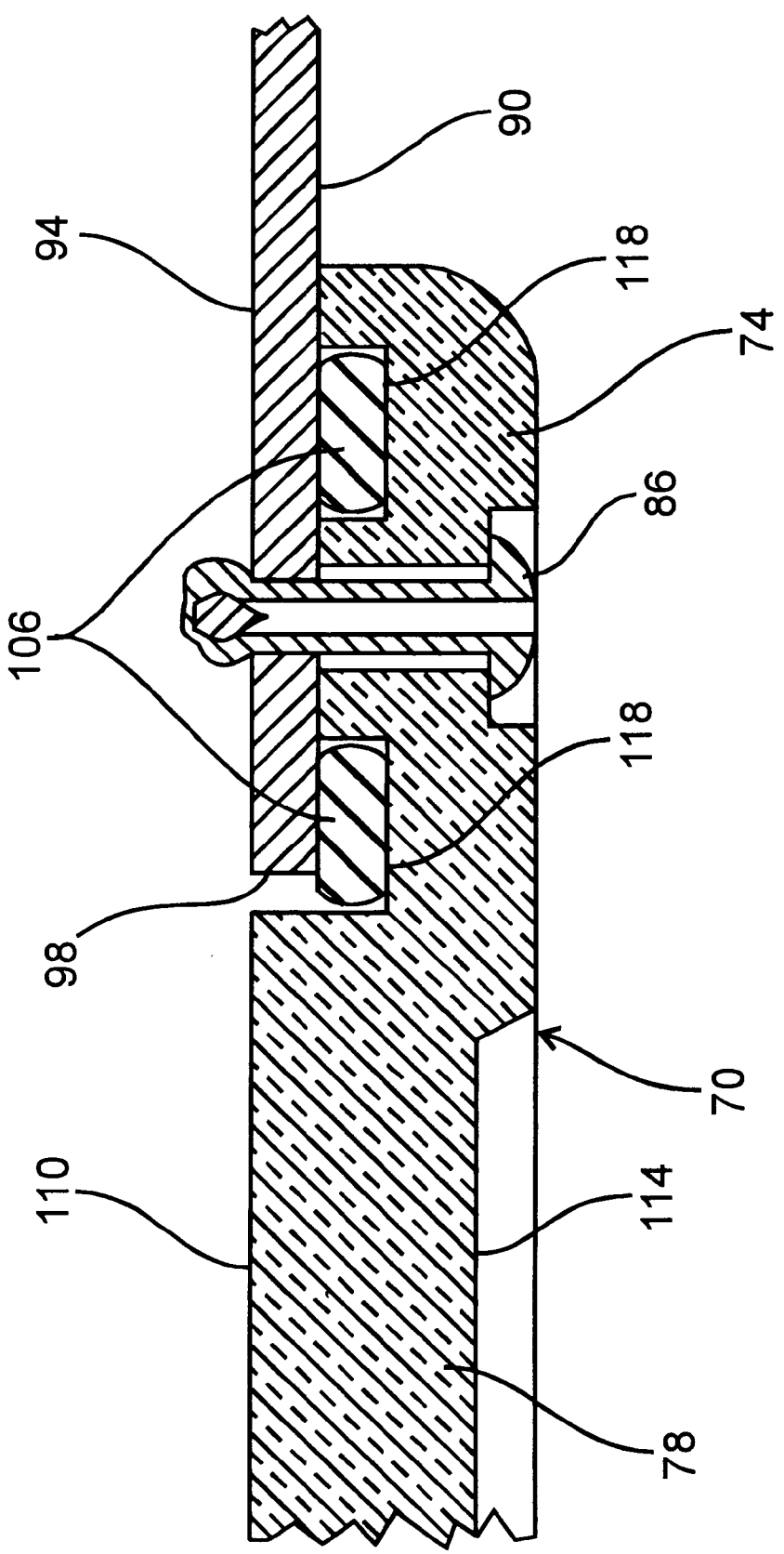
FIG. 5 is a detailed partial cross-section view of the disconnect switch cover and viewing window of the present invention.

Referring now to FIG. 5, a detailed partial cross-section of a second embodiment of the sealing flange 74 is shown. In this embodiment the rear surface of the sealing flange 74 includes a gasket pocket 118 which receives the gasket 106 and prevents it from being excessively compressed between the cover 94 and the sealing flange 74.

We claim:

1. An electrical disconnect switch comprising:

an enclosure;

a switch mechanism mounted within said enclosure;

a cover, being rotatably attached to said enclosure such that said cover can be selectively moved between an open position and a closed position, said cover further defining an opening immediately adjacent said switch mechanism when said cover is in said closed position such that a visual verification of the ON or OFF state of said switch mechanism can be made prior to selectively moving said cover to said open position, said cover further defining a plurality of apertures spaced around the perimeter of said opening;

a viewing window having a generally transparent viewing area dimensioned to be received within said opening of said cover, said viewing window defining an integral sealing flange surrounding said transparent viewing area, said viewing window further defining a plurality of apertures spaced around the perimeter of said viewing area in said sealing flange, each of said viewing window apertures coinciding with one of said plurality of apertures of said cover when said viewing area is received within said cover opening; and a plurality of fasteners for securing said viewing window to said cover, each of said plurality of fasteners being receivable within one of said coinciding window and cover apertures.

2. The electrical disconnect switch of claim 1 wherein said sealing flange is opaque.

3. The electrical disconnect switch of claim 1 wherein a front surface of said viewing area is recessed behind a front surface of said sealing flange to prevent scratching during shipping.

4. The electrical disconnect switch of claim 1 wherein said plurality of fasteners are rivets.

5. The electrical disconnect switch of claim 1 wherein said plurality of fasteners are screws.

6. The electrical disconnect switch of claim 1 wherein said viewing area further comprises a magnifying lens.

7. The electrical disconnect switch of claim 1 wherein said electrical disconnect switch further comprises a gasket dimensioned to be received between said sealing flange and said cover to provide a seal for preventing the ingress of water and dust.

8. The electrical disconnect switch of claim 7 wherein said sealing flange defines a gasket pocket for receiving a portion of said gasket to prevent excessive compressing of said gasket.

9. The electrical disconnect switch of claim 7 wherein said gasket is an O-ring.

10. An electrical disconnect switch comprising:

an enclosure;

a switch mechanism mounted within said enclosure;

a cover, being rotatably attached to said enclosure such that said cover can be selectively moved between an open position and a closed position, said cover further defining an opening immediately adjacent said switch mechanism when said cover is in said closed position such that a visual verification of the ON or OFF state of said switch mechanism can be made prior to selectively moving said cover to said open position, said cover further defining a plurality of apertures spaced around the perimeter of said opening;

a viewing window having a generally transparent viewing area dimensioned to be received within said opening of said cover, said viewing window defining an integral sealing flange surrounding said transparent viewing area, said viewing window further defining a plurality of apertures spaced around the perimeter of said viewing area in said sealing flange, each of said viewing window apertures coinciding with one of said plurality of apertures of said cover when said viewing area is received within said cover opening;

a seal positioned between said sealing flange and an outside surface of said cover surrounding said opening; and a plurality of fasteners for securing said viewing window to said cover, each of said plurality of fasteners being receivable within one of said coinciding window and cover apertures.

11. The electrical disconnect switch of claim 10 wherein said seal is a gasket dimensioned to be received between said sealing flange and said outside surface of said cover to provide said seal for preventing the ingress of water and dust.

12. The electrical disconnect switch of claim 10 wherein said seal is an O-ring.

13. The electrical disconnect switch of claim 10 wherein said seal is a caulking material.

* * * * *